Sept. 9, 1947.                O. A. FISKAALI                2,427,267
                                  FISH LURE
                             Filed Jan. 16, 1945
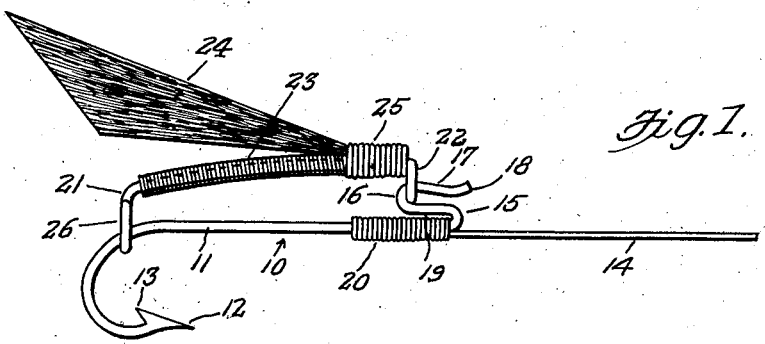
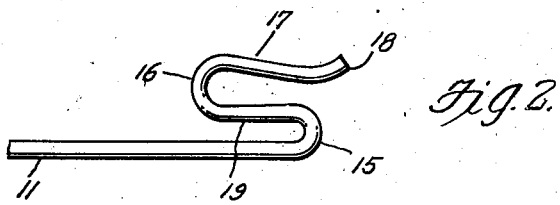
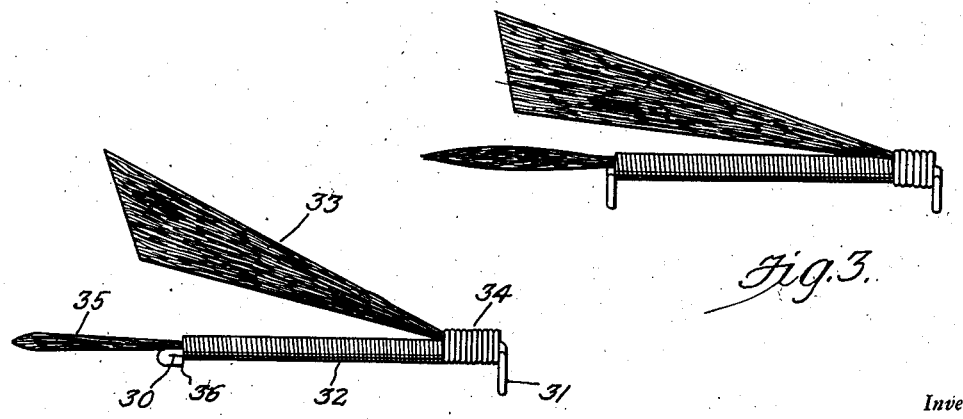
Inventor
Otto A. Fiskaali,
By Clarence A. O'Brien
and Harvey B. Jacobson
                        Attorneys Patented Sept. 9, 1947

2,427,267

UNITED STATES PATENT OFFICE 2,427,267

FISH LURE

Otto A. Fiskaali, Fitchburg, Mass.

Application January 16, 1945, Serial No. 573,019

2 Claims. (Cl. 43—48)

This invention relates to a fish lure, and more particularly to such a lure as an artificial fly or bug.

A primary object of this invention is the provision of an improved fish lure adapted to be attached to or detached from a hook, in such manner that the same hook may be utilized for various types of flies or bugs.

An additional object of the invention is the provision of such a device which may be readily secured on or removed from the hook as desired, and which will remain thereon when the hook is struck by a fish.

Still another object of the invention is the provision of such a lure which may be utilized with a hook, either with or without a leader as desired.

A further object of the invention is the provision of an improved hook adapted particularly for use with such a lure.

Still another object resides in the combination of an improved hook and detachable lure in association therewith.

Other objects will in part be obvious and in part be pointed out as the description of the invention proceeds and shown in the accompanying drawings, wherein there is shown a preferred embodiment of this inventive concept.

In the drawings:

Figure 1 is a side elevational view of one form of hook and fly embodying features of the instant inventive concept.

Figure 2 is an enlarged constructional detail of a portion of a hook.

Figure 3 is a side elevational view of one form of fly adapted to be associated with the hook comprising a feature of the invention, and Figure 4 is a side elevational view of a modified form of fly.

Similar reference characters refer to similar parts throughout the several views of the drawings.

Having reference now to the drawings there is generally indicated at 10 a hook, including a shank 11, a point 12 and a barb 13, all of conventional configuration. However, in place of the customary loop for attachment to a line or leader 14, there is provided a loop 15, extending in alignment with the shank 11, and terminating in a bend 16 to form a second reverse loop, from which a portion 17 extends rearwardly with respect to the shank of the hook. The extremity of the portion 17 is flared as at 18, and is spaced from the side 19 of the associated reverse loop, in such manner as to provide a space within which a portion of the fly may be secured in a manner to be more fully described hereinafter. The leader or line 14 is adapted to be secured to the shank 11 in any desired manner as by lashings 20. The fly or lure comprising a feature of the present invention includes a longitudinally extending wire 21, having a loop 22 positioned transversely to the length of the wire 21, and being bent at right angles thereto. A suitable body 23 of any desired configuration or coloration provided with wings, or feathers in simulation of wings 24, may be secured to the wire 21 in any desired conventional manner as by windings or lashings 25.

In the modification of the device disclosed in Figures 1 and 3, the rear end of the wire 21 is also provided with a loop 26, in alignment with the loop 22.

In the operation and use of the device, the loop 26 is passed over the hook, until it engages the shank member 11, and the loop 20 hooked in the space between the portions 17 and 19 forming the sides of the loop 16.

From the foregoing it will now be seen that the lure may be readily attached to and disassociated from the hook 10 as desired. Obviously, various types of flies may be utilized with the same hook, and the same hook utilized all day, or conversely the same fly may be utilized with a plurality of sizes of hooks.

In Figure 4 a modified form of construction is disclosed, wherein a longitudinally extending wire 30 terminating in a loop 31 similar to the loop 27, and has secured thereto a body portion 32, and feathers in simulation of wings 33, the parts being secured in assembled relation as by windings or lashings 34. If desired, additional feathers or similar objects 35 may be correspondingly provided at the rear extremity of the device. In this modification the end of the wire 30 terminates in a bend 36, the rear loop corresponding to the loop 26 being omitted. When the loop 31 is engaged in the bend 16 between the portions 17 and 19, this type of lure obviously acts with a "wiggling" motion when drawn through the water, or on the surface thereof, when used as a dry fly, and may be particularly effective in attracting certain types of fish.

Obviously, if desired the lure may be made in the form of a bass bug or similar article, wherein the body is comprised of a cork, through which extends a wire provided with loops similar to the loops 20 and 26.

Now from the foregoing it will be seen that there is herein provided an improved fish lure and hook to be utilized in association therewith, which accomplishes all the objects of this invention and others including many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

I claim:

1. In a fish hook and lure, in combination, a hook including a shank, a point on an extremity at the rear thereof, a barb adjacent said point, the other extremity of said shank being bent, upon the opposite side from said barb, rearwardly in spaced, parallel arrangement relative to the shank, and a reverse bend in said extremity to form an S-shaped portion, opening forwardly of said shank, and a lure adapted to be secured in said reverse bend, said lure comprising a longitudinally extending wire, a body surrounding said wire, and means forming a depending eye at an extremity of said wire for engagement in said reverse bend.

2. In a fish hook and lure, in combination, a hook including a shank, a point on an extremity at the rear thereof, a barb adjacent said point, the other extremity of said shank being bent rearwardly upon the opposite side from the barb in spaced parallel arrangement relative to the shank, and a reverse bend in said extremity to form an S-shaped portion, opening forwardly of said shank, and a lure adapted to be secured in said reverse bend, said lure comprising a longitudinally extending wire, a body surrounding said wire, means forming an eye at an extremity of said wire for engagement with said reverse bend, and means forming a second eye at the opposite end of said wire portion adapted to surround said shank.

OTTO A. FISKAALI.

REFERENCES CITED

The following references are of record in the file of this patent:

UNITED STATES PATENTS

| Number | Name | Date |
|---|---|---|
| 2,328,295 | Provost | Aug. 31, 1943 |
| 2,148,074 | Kaspick | Feb. 21, 1939 |
| 2,106,370 | Bryan | Jan. 25, 1938 |
| 2,315,575 | Austad | Apr. 6, 1943 |
| 468,376 | Upton | Feb. 9, 1892 |
| 1,961,378 | Mitchell | June 5, 1934 |
| 2,016,756 | Taylor | Oct. 8, 1935 |